United States Patent [19]
Wirth

[11] Patent Number: 5,096,104
[45] Date of Patent: Mar. 17, 1992

[54] SKI CARRIER

[76] Inventor: John G. Wirth, R.D. #2, Box 128, Cochranville, Pa. 19330

[21] Appl. No.: 575,340

[22] Filed: Aug. 30, 1990

Related U.S. Application Data

[63] Continuation-in-part of Ser. No. 393,225, Aug. 14, 1989, Pat. No. 4,953,773.

[51] Int. Cl.$^5$ .............................................. A45F 4/00
[52] U.S. Cl. ......................... 224/151; 224/42.01; 224/202; 224/245; 224/328; 224/917; 206/315.1; 206/591
[58] Field of Search ............... 224/917, 328, 151, 316, 224/42.01, 205, 245, 202; 206/315.1, 443, 579, 591

[56] References Cited

U.S. PATENT DOCUMENTS

| | | | |
|---|---|---|---|
| 3,921,871 | 11/1975 | Heil | 224/917 |
| 4,084,735 | 4/1978 | Kappas | 224/917 |
| 4,126,254 | 11/1978 | Sahakian | 206/315.1 |
| 4,215,786 | 8/1980 | Vertes | 206/591 |
| 4,402,355 | 9/1983 | Wymore et al. | 206/315.1 |
| 4,860,935 | 8/1989 | Pavlinsky | 224/917 |

FOREIGN PATENT DOCUMENTS

| | | | |
|---|---|---|---|
| 2239120 | 2/1974 | Fed. Rep. of Germany | 224/328 |
| 2284349 | 4/1976 | France | 224/328 |

*Primary Examiner*—Linda J. Sholl
*Attorney, Agent, or Firm*—Connolly & Hutz

[57] ABSTRACT

A ski carrier is in the form of a generally rigid tube having a front nose and a rear cap interconnected by a body portion. A divider is located in the body portion to form at least two compartments. A set of skis would be mounted in one of the compartments in such a manner as to maintain the bindings out of contact with the inner wall of the tube. This is accomplished by having supports located in the front nose and rear cap for the skis. The ski poles would be in the other compartment.

27 Claims, 3 Drawing Sheets

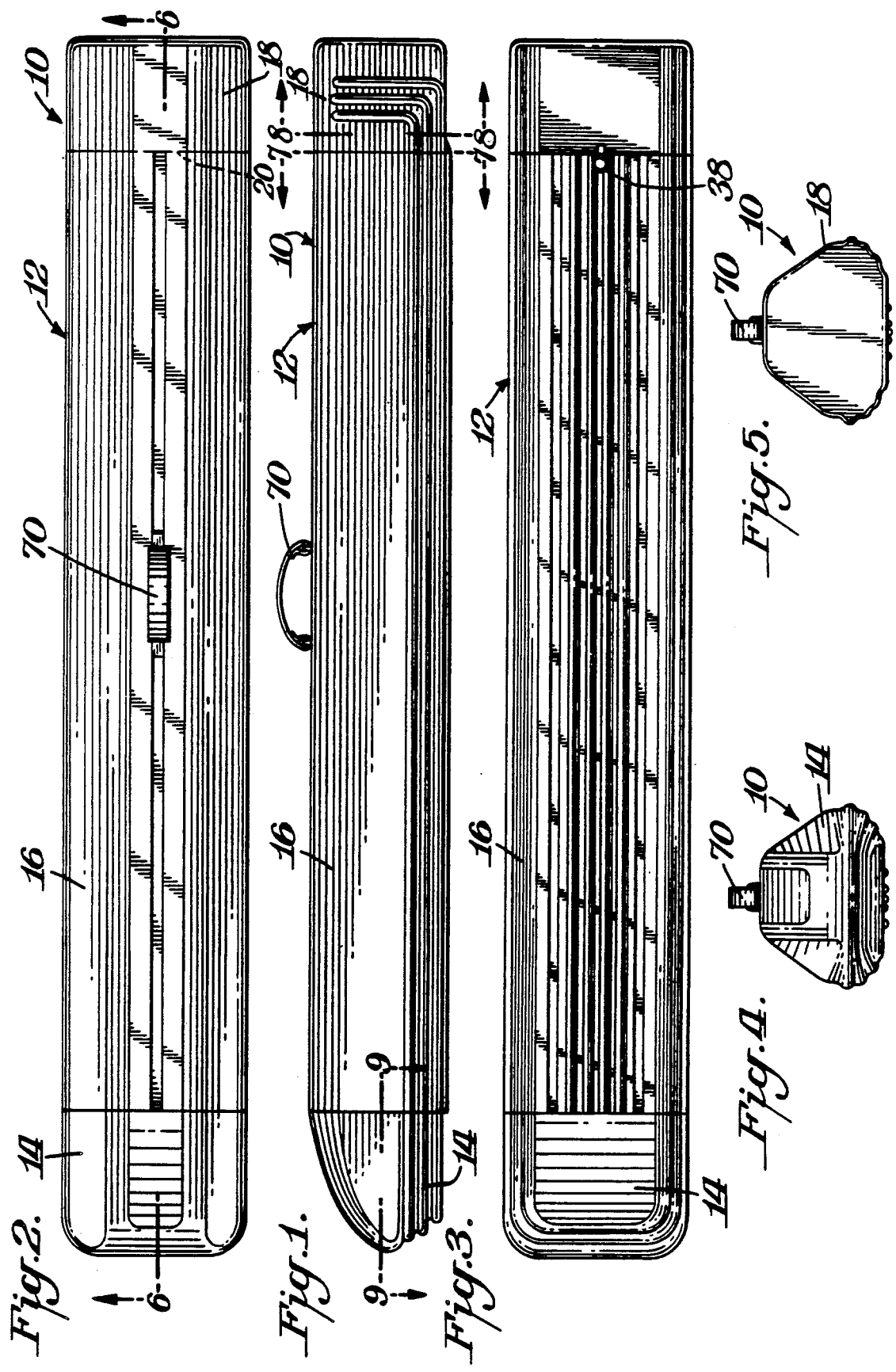

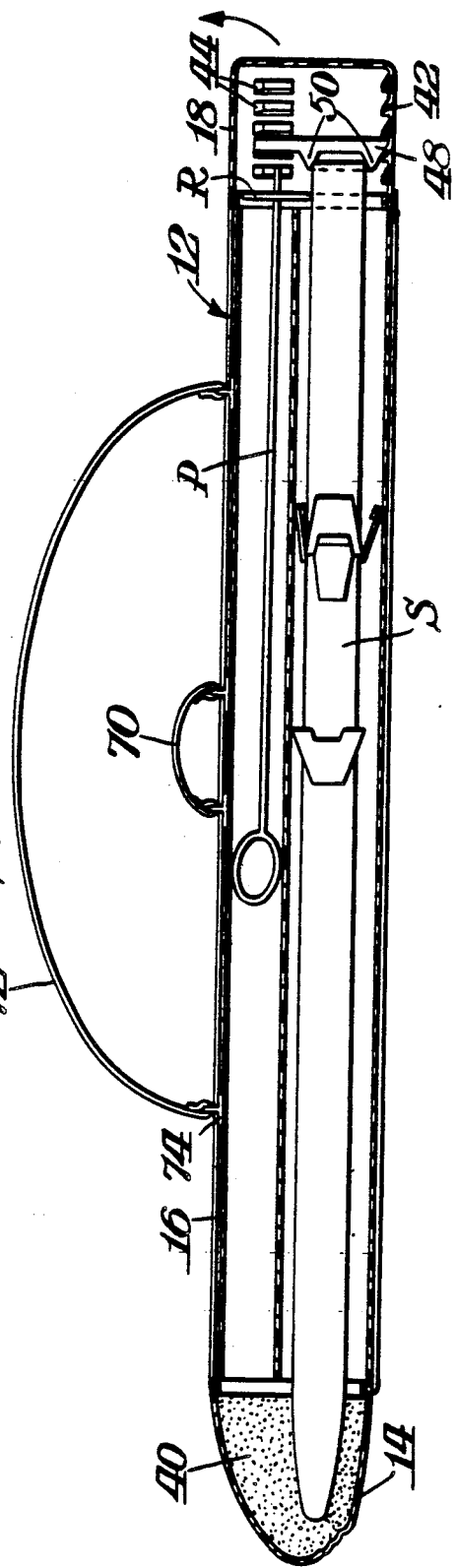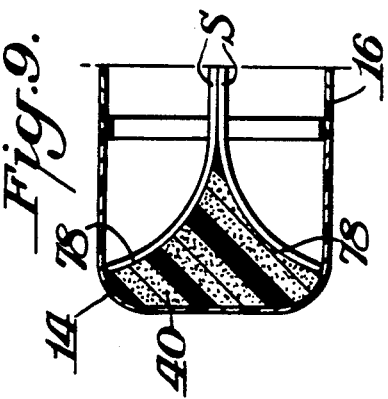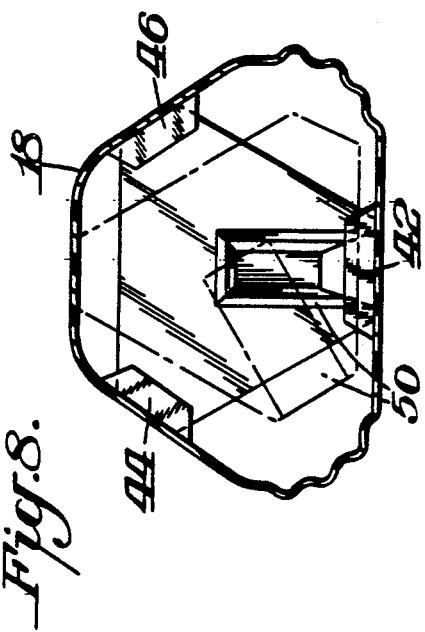

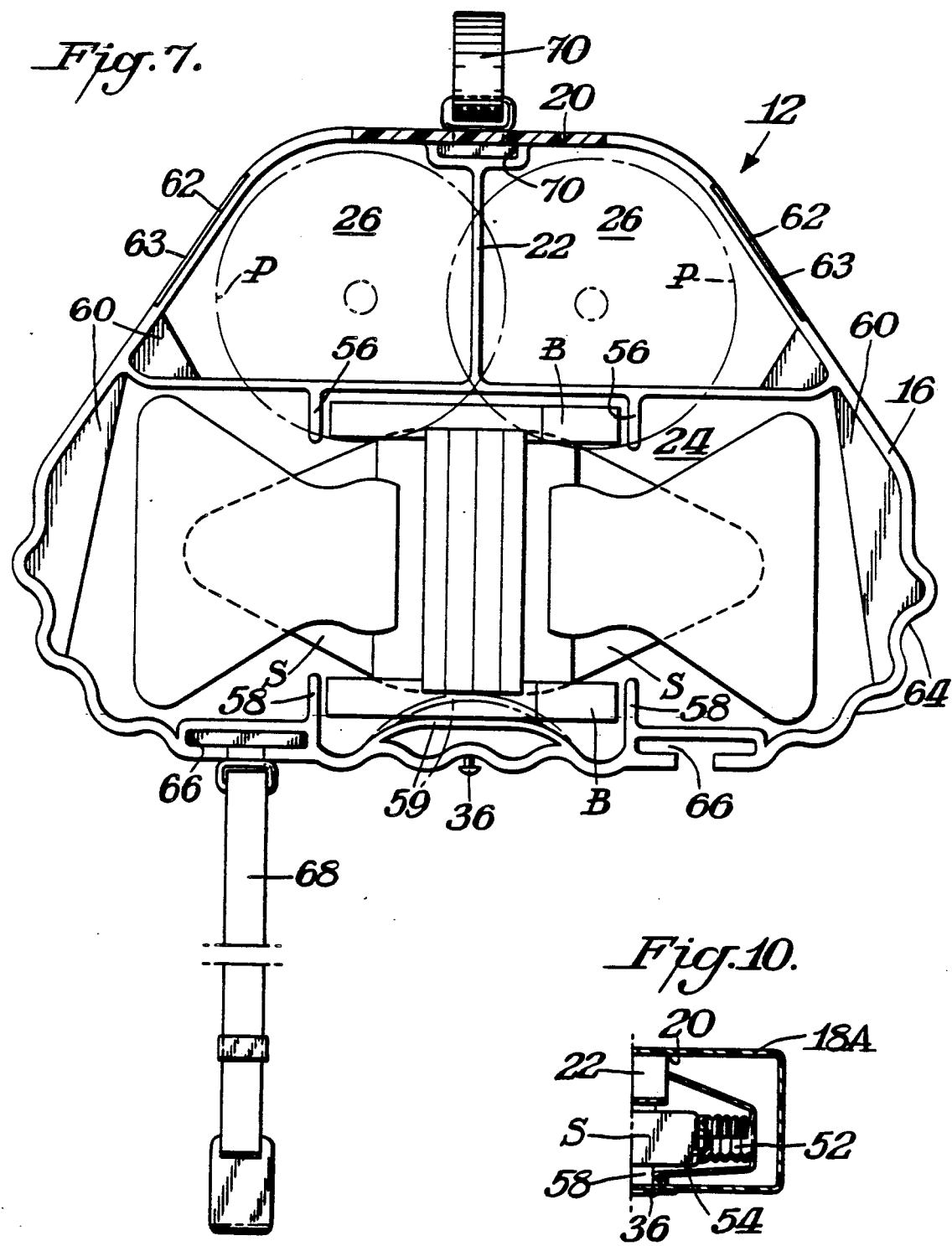

SKI CARRIER

CROSS-REFERENCE TO RELATED APPLICATION

This application is a continuation-in-part of Ser. No. 393,225, filed Aug. 14, 1989, now U.S. Pat. No. 4,953,773.

BACKGROUND OF INVENTION

The ever high quality and price of fine skis and bindings have created the need for a protective container of the same caliber. Greater equipment expense has exacerbated the problem of travel related damage whether caused by road debris, salt corrosion or freezing rain while atop a rack or by airline baggage handling abuse. Unprotected skis are exposed to cosmetic injury and dangerous detuning of release settings. Most damage to skis is done not while in use, but while in transit. Various devices have been used to store and transport skis. These devices have included ski racks mounted to a vehicle where the skis are mounted in an exposed condition. Other devices have included bag like devices which may be carried by the user. It would be desirable if a ski carrier could be provided which maintains the skis in a protected manner to prevent, for example, damage to the bindings. It would also be desirable if a ski carrier could be provided which is capable of being mounted to a vehicle as well as capable of being carried by the user and is also capable of being stored in a convenient manner during periods of non-use. It would further be desirable if such a ski carrier could be aerodynamically shaped so as to minimize air resistance when the ski carrier is mounted to a vehicle.

Such an ideal ski carrier should minimize the inconvenience of cleanings of the equipment. The ideal ski carrier should also provide secure summer storage and be sufficiently light weight, strong and inexpensive.

SUMMARY OF INVENTION

An object of this invention is to provide a ski carrier which fulfills the above needs.

A further object of this invention is to provide such a ski carrier which is a convenient and secure container to transport skis and poles whether by airplane or automobile.

A still further object of this invention is to provide such a ski carrier which is lightweight, portable and physically appealing.

In accordance with this invention, the ski carrier is in the form of an aerodynamically shaped tube having sufficient rigidity to protect the skis. The tube is divided into a plurality of compartments so that the skis and other equipment, such as the ski poles, could be inserted into individual compartments. The tube includes supports so that the skis are mounted in the tube in such a manner as to maintain the bindings spaced from the wall of the tube to avoid damage to the bindings. One end of the tube is openable to permit ready insertion and removal of the skis and other equipment.

In a preferred practice of the invention a divider extends longitudinally down the tube to form at least two separate compartments. Both skis in a set of skis would be mounted in one compartment and the ski poles or other equipment would be mounted in the other compartment.

The skis are supported in their compartment preferably by a tail piece cup in the rear cap at the openable end of the tube and also by a spacer in the nose of the tube. In the preferred practice of the invention flanges are provided in the ski compartment to act as a guide for the skis.

THE DRAWINGS

FIG. 1 is a side elevation view of a ski carrier in accordance with this invention;

FIGS. 2-3 are top and bottom plan views of the ski carrier shown in FIG. 1;

FIGS. 4-5 are front and rear elevation views of the ski carrier shown in FIGS. 1-3;

FIG. 6 is a cross-sectional view taken through FIG. 2 along the line 6—6.

FIG. 7 is a cross-sectional view taken through FIG. 1 along the line 7—7;

FIG. 8 is a cross-sectional view taken through FIG. 1 along the line 8—8;

FIG. 9 is a cross-sectional view taken through FIG. 1 along the line 9—9; and

FIG. 10 is a perspective view partly broken away of an alternative form of rear cap in accordance with a further embodiment of this invention.

DETAILED DESCRIPTION

The present invention relates to variations of the ski carrier which is described in parent U.S. Pat. No. 4,953,773, the details of which are incorporated herein by reference thereto. Some of the main differences between the present invention and the preferred embodiment of the parent patent are that the present invention uses a simplified wall structure. Additionally, with the present invention, both skis in a set of skis would be stored in the same compartment and would be held in position by supports provided in the front nose and rear cap of the tube. Additionally, guides are mounted in the ski carrier compartment to assure the proper positioning of the skis.

FIGS. 1-8 illustrate the details of one embodiment of this invention. As shown therein, the ski carrier 10 is in the form of a tube 12 having a nose portion 14, a central main body portion 16 and a cap portion 18. Nose portion 14 is generally bullet shaped to provide an aerodynamic form to the carrier 10. In general the carrier is of substantially oval cross-section as best shown in FIGS. 4-5. Nose 14 is permanently secured to body portion 16 in any suitable manner, such as by solvent sealing. Cap portion 18 is hinged to body portion 16 by a portion of cap 18 being solvent sealed or secured in any other suitable manner to body portion 16 thereby having a joint portion which forms a hinge 20. Hinge 20 may be an internal rolling hinge, such as found on a door.

A divider or partition 22, which is preferably of inverted T-form is mounted within portion 16 and extends substantially the entire body length of body portion 16. In the preferred practice of the invention, partition 22 terminates about 6 inches from hinge 20 to permit access to the interior of body portion 16. As best shown in FIG. 7, partition 22 divides body 16 into 3 compartments, namely ski carrier compartment 24 and additional compartments 26, 26. If desired, partition 22 may simply be a flat plate without the upright flange so that only two compartments result. Thus, the skis would be mounted in compartment 24 and the poles or other equipment could be mounted in the single compartment 26. Divider 22 may be made integral with body portion 16, by being extruded in the same operation as the extrusion of body portion 16 or may be a separate member inserted in the body portion and held in place in any suitable manner, including by means of the close dimensioning of partition 22 with respect to body portions 16. Body portions 16, partition 22, nose 14 and cap 18 are preferably made of a generally rigid material such as a polycarbonate or Lexan which would be UV safe, fracture proof and extrudable. Other possible materials include PVC.

As previously noted, cap 18 is hingedly connected by hinge section 20 to body portion 16, thus providing access to the interior of the body portion 16 for the loading and unloading of the ski equipment. Cap 18 and body or tube 16 also include a locking structure 36 to maintain the cap lock during conditions of use as described in the parent application. Locking structure 36 is preferably a hasp having a mounting circle or ring 38 through which a combination lock or other lock may be inserted.

As shown in FIG. 6 a spacer 40 which is preferably a resilient compressible foam block is located in nose portion 14. Spacer 40 includes a recess or curved converging inclined surfaces 78, 78 shaped to receive the tips of skis S and thus hold the tips in the proper position at one end of carrier 10. A support is provided in the cap portion 18 of carrier 10 for holding the heels of the skis in proper position. In the preferred practice of this invention a series of spaced ribs 42 are provided on the bottom portion of cap 18. Two other sets of ribs 44, 46 are also mounted on the inner surface of cap 18. A plate-like tail piece 48 which is generally triangularly shaped is removably positioned in cap 18 by being located between the aligned sets of ribs. FIG. 8, for example, shows tail piece 48 in phantom in its position when it is being inserted or being removed from cap 18. As shown therein tail piece 48 is rotated so that its three corners are disposed between or out of alignment with the three sets of ribs 42, 44 and 46. Thus, the tail piece 48 could be telescoped into cap 18 until it is in the proper location in accordance with the length of skis S. When in the proper location tail piece 18 is rotated so that its corners are mounted in line with corresponding sets of ribs as shown in solid lines in FIG. 8 and in FIG. 6. In this position tail piece 18 is vertically mounted in place. Tail piece 48 includes a cup structure 50 created by appropriately shaped projections for receiving the heels of skis S so that the skis are effectively supported at the heals when cap 18 is closed. Cup 50 may also be used as a handle for manipulating tail piece 48.

FIG. 10 shows an alternative arrangement wherein a bellows formation 52 is formed in cap portion 18A in a modified form of this invention. The bellows formation 52 is preferably blow molded so as to be integral with cap 18A. Bellows formation 52 includes a front contact face 54 for urging against the heels of the set of skis S when the heels compress the bellows formation.

As best shown in FIG. 7 two sets of flanges 56, 56 and 58, 58 are provided in ski storage compartment 24. Flanges 56 are integral with partition 22, while flanges 58 are aligned with flanges 56 and are integral with the base of body portion 16. Flanges 56, 56 and 58, 58 are dimensioned and positioned to effectively guide the skis in their proper position when the skis are inserted in tube 16. The flanges also function to hold the ski brakes B in place. As illustrated resilient diaphragm 59 on the base of body portion 16 is moved downwardly by the brakes B and react to urge the brakes upwardly toward partition 22.

To add greater stability to the tubular structure a series of internal wall supports or ribs 60 are provided in the tube carrying compartment 24 and in the auxiliary compartments 26, 26.

As shown in FIG. 7, opposite sides of body portion or tube 16 are longitudinally indented as indicated by the reference numeral 62 so that logos or other color panels 63 could be inserted without affecting the aerodynamic shape of the carrier 10 or breaking its smooth continuous configuration.

A further advantageous feature of the invention is that the lower half of tube section 16 is longitudinally undulated as indicated by the reference numeral 64. The undulations 64 advantageously function to throw off dirt and are located in the lower half where most of the abuse to such a carrier might occur.

A further feature of carrier 10 is the inclusion of channels or tracks 66 at the bottom of carrier 10 to facilitate the mounting of carrier 10 on, for example, a vehicle. FIG. 7 for example illustrates a tie strap 68 secured in one of the tracks 66 which would be used to secure carrier 10 to a vehicle.

The top of carrier 10 is provided with an additional track or channel 70 to facilitate its portability. As illustrated in the drawings a large carrying handle 72 is attached to carrier 10 by having its rigid base 74 at each end of handle 72 inserted in track 70. Any suitable mechanism such as a tightening clamp could be used to fix the bases 74 in place so that the enlarged strap 72 could function as a shoulder carrying strap. Additionally, a shorter strap 76 is similarly mounted in track or channel 70 and functions as a hand carrying strap. Strap 76 might be permanently secured to carrier 10 while strap 72 is preferably detachably secured since for shipping by airlines for example it would be desired if a lengthy strap such as strap 72 were not attached to carrier 10.

In operation with the embodiment of FIGS. 1–9, cap 18 would be opened and tail piece 48 would be inserted by using cup 50 as a handle to rotate tail piece 48 so that its corner are out of alignment with ribs 42, 44, 46. Cap 18 would have sufficient resiliency to permit tail piece 48 to be manipulated. Tail piece 48 would then be telescoped into cap 18 to the desired location in accordance with the length of the skis. Carrier 10 for example could be dimensioned to hold either cross-country (Nordic) or downhill (Alpine) skis. When tail piece 48 is properly positioned tail piece 48 is rotated by grasping cup 50 and twisting the tail piece 48 until its corners are locked between pairs of adjacent ribs 42, 44, 46. A ski would then be inserted into compartment 24 by disposing the ski between the sets of flanges 56, 56 and 58, 58 until the tip of the ski is disposed against inclined surface 78 of block or positioner 40. The second ski of the pair of skis would then be inserted in the same manner bottom to bottom with the first ski. If desired, both skis could be simultaneously inserted in compartment 24. The ski poles P would then be inserted in individual compartments 26, 26 where divider or partition 22 is inverted T-shape or into a single compartment 26 where divider 22 is simply a flat divider plate extending across the interior of tubular body portion 16. FIG. 6 illustrates the positioning of poles P when inserted in carrier 10. End cap 18 would then be closed and held in its closed position by lock 36. When end cap 18 is closed, the heels of the skis fit in pocket 50. Accordingly, the set of skis is held firmly in position at opposite ends by means of the supports provided by tail piece 48 and mounting block 40. The poles are also prevented from undesired movement in that the rings are at the ends of the poles fit against the outer end of divider 22 and thus limit the amount that the poles can slide in their compartments 26.

In the alternative form of the invention shown in FIG. 10, the same manner of operation would be used except that an adjustable support member, such as tail piece 48 would not be provided. Instead, the compressible bellows formation 52 would provide the necessary adjustment and support by the ends of the skis fitting against the bellows and compressing the bellows in accordance with the length of the skis. The tendency of the bellows to expand to their normal condition would serve as the support at the heel end of skis S.

As can be appreciated, the present invention thus provides a convenient and reliable ski carrier which effectively mounts the skis in a protective manner whereby the bindings are maintained out of contact with the inner wall of the ski carrier. Additionally, ski carrier 10 has the advantage of portability. In this respect, the carrier may be conveniently mounted on the roof of a vehicle by the use of tracks or channels 66 and tie strap 68. Alternatively, carrier 10 may be manually carried by the use of shoulder strap 72 or hand strap 76. Further the carrier 10 may be conveniently transported in other manners such as by airplane when shoulder strap 72 is removed.

A further advantage of the ski carrier 10 is its adaptability to effectively hold skis of different lengths due to the adjustability in the manner of supporting the skis at both ends.

What is claimed is:

1. A ski carrier comprising a generally rigid tube having a front nose and a rear cap interconnected by a body portion, said body portion having a hollow interior, said cap being connected to said body portion by connecting means whereby said cap is selectively movable to an open position which provides access to said interior and to a closed position which closes said interior, support means in said tube for supporting at least one ski in said interior while maintaining the ski binding away from the inner surface of said body portion, said support means comprising a first support member at said front nose for contacting one end of the ski, a second support member at said rear cap for contacting the opposite end of the ski whereby the ski is maintained longitudinally in position in said interior, one of said support members being longitudinally adjustable for accommodating different length skis, and index means for selectively maintaining said adjustable support member fixed at one of a number of different incremental longitudinal positions.

2. The carrier of claim 1 wherein guide means are in said interior to guide the ski toward contact with said nose support member when said rear cap is in said open position and the ski is inserted into said ski storage compartment.

3. The carrier of claim 2 wherein said rear cap support member is longitudinally adjustable.

4. The carrier of claim 2 wherein said guide means comprises flanges extending longitudinally in said ski storage compartment.

5. The carrier of claim 4 wherein said flanges comprises a first set of flanges extending downwardly from said divider, a second set of flanges extending upwardly from the base of said body portion in line with said first set of flanges, and a resilient diaphragm on said base between said second set of flanges.

6. The carrier of claim 1 wherein said adjustable support member comprises a plate shaped tail piece having a ski receiving cup on its surface disposed toward said interior.

7. The carrier of claim 6 wherein said index means includes a plurality of sets of spaced ribs, and said tail piece being selectively positionable between adjacent pairs of ribs of said plurality of sets.

8. The carrier of claim 7 wherein said tail piece is generally triangularly shaped with three corners, said plurality of sets of ribs comprising three sets of ribs, and said tail piece being dimensioned to pass over said ribs when said corners are out of alignment with said ribs and to be locked between adjacent ribs in each of said sets when said tail piece is positioned with said corners in line with said ribs.

9. The carrier of claim 1 wherein said nose support member comprises a support block in said nose, and said support block having a longitudinally inclined curved surface whereby the tip of a ski may be disposed against said inclined surface.

10. The carrier of claim 9 wherein said support block is made of a compressible resilient foam material, and said support block having a pair of converging longitudinally inclined curved surfaces whereby the tips of a pair of bottom to bottom skis may be disposed against said curved surfaces.

11. The carrier of claim 1 wherein the bottom half of said body portion has an undulated outer surface with the undulations extending longitudinally thereof.

12. The carrier of claim 1 including a longitudinal channel formed in the top outer surface of said body portion to form a track for the insertion of a carrying strap.

13. The carrier of claim 12 including a pair of lower longitudinal channels formed in the bottom outer surface of said body portion to form a pair of spaced tracks for the insertion of tie down straps to secure said carrier to a vehicle.

14. The carrier of claim 13 including a hand strap mounted to said top surface channel.

15. The carrier of claim 14 including an enlarged shoulder strap detachably mounted to said top surface channel, said shoulder strap being longer than said hand strap, and each end of said shoulder strap being mounted outwardly of a respective end of said hand strap.

16. The carrier of claim 1 wherein said divider is a horizontal plate which divides said body portion into a lower ski storage compartment and an upper compartment.

17. The carrier of claim 16, in combination with a pair of skis and a pair of ski poles having rings at one end, said divider terminating short of said rear cap, said pair of skis being disposed bottom to bottom in said ski storage compartment with the tips of said skis in said nose and the heels of said skis in said rear cap, said ski poles being in said upper compartment, and said rings and ends of said poles being in said rear cap.

18. The carrier of claim 1 wherein a pair of longitudinal indents are formed in the outer surface on opposite sides of said body portion, a panel being in each of said indents, and each of said panels having a thickness equal to the depth of its respective indent whereby said outer surface is of smooth continuous configuration.

19. The carrier of claim 1 wherein a divider is in said body portion longitudinally dividing said body portion into a plurality of individual longitudinal compartments, and one of said compartments being a ski storage compartment.

20. The carrier of claim 19 wherein said body portion is of uniform cross-sectional area.

21. The carrier of claim 19 wherein said divider is of an inverted T which divides said body portion into a lower ski storage compartment and a pair of upper compartments.

22. The carrier of claim 21, in combination with a pair of skis and a pair of ski poles having rings at one end, said divider terminating short of said rear cap, said pair of skis being disposed bottom to bottom in said ski storage compartment with the tips of said skis in said nose and the heels of said skis in said rear cap, each of said ski poles being in a different one of said upper compartments, and said rings and ends of said poles being in said rear cap.

23. The carrier of claim 1 wherein said index means comprises a plurality of sets of spaced ribs, and said adjustable support member being selectively positionable between adjacent pairs of ribs of said plurality of sets.

24. A ski carrier comprising a generally rigid tube having a front nose and a rear cap interconnected by a body portion, a divider in said body portion longitudinally dividing said body portion into a plurality of individual longitudinal compartments, one of said compartments being a ski storage compartment, said cap being connected to said body portion by connecting means whereby said cap is selectively movable to an open position which provides access to said compartments and to a closed position which closes said compartments, support means in said tube for supporting at least one ski in said ski storage compartment while maintaining the ski binding away from the inner surface of said body portion, said support means comprising a pair of spaced support members, one of said support members being in said front nose and the other of said support members is in said rear cap, guide means being in said ski storage compartment to guide the ski toward contact with said nose support member when said rear cap is in said open position and the ski is inserted into said ski storage compartment, said rear cap support member being longitudinally adjustable, and said rear cap support member comprising a plate shaped tail piece having a ski receiving cup on its frontal surface.

25. The carrier of claim 24 wherein said rear cap includes a plurality of sets of spaced ribs, and said tail piece being selectively positionable between adjacent pairs of ribs of said plurality of sets.

26. The carrier of claim 25 wherein said tail piece is generally triangularly shaped with three corners, said plurality of sets of ribs comprising three sets of ribs, and said tail piece being dimensioned to pass over said ribs when said corners are out of alignment with said ribs and to be locked between adjacent ribs in each of said sets when said tail piece is positioned with said corners in line with said ribs.

27. A ski carrier comprising a generally rigid tube having a front nose and a rear cap interconnected by a body portion, a divider in said body portion longitudinally dividing said body portion into a plurality of individual longitudinal compartments, one of said compartments being a ski storage compartment, said cap being connected to said body portion by connecting means whereby said cap is selectively movable to an open position which provides access to said compartments and to a closed position which closes said compartments, support means in said tube for supporting at least one ski in said ski storage compartment while maintaining the ski binding away from the inner surface of said body portion, said support means comprising a pair of spaced support members, one of said support members being in said front nose and the other of said support members is in said rear cap, guide means being in said ski storage compartment to guide the ski toward contact with said nose support member when said rear cap is in said open position and the ski is inserted into said ski storage compartment, said guide means comprising flanges extending longitudinally in said ski storage compartment, said flanges comprising a first set of flanges extending downwardly from said divider, a second set of flanges extending upwardly from the base of said body portion in line with said first set of flanges, and a resilient diaphragm on said base between said second set of flanges.

* * * * *